United States Patent
Miller et al.

(10) Patent No.: US 12,088,547 B2
(45) Date of Patent: Sep. 10, 2024

(54) EFFICIENT FORWARDING OF MESSAGES THROUGH BROKERS BY TOPIC

(71) Applicant: Microsoft Technology Licensing, LLC, Redmond, WA (US)

(72) Inventors: Peter Gregg Miller, Seattle, WA (US); David Michael Sauntry, Redmond, WA (US); Kevin Thomas Damour, Redmond, WA (US); Bhawandeep Singh Panesar, Bellevue, WA (US); Dmitri Alexandrovich Klementiev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/828,715

(22) Filed: May 31, 2022

(65) Prior Publication Data
US 2023/0336510 A1    Oct. 19, 2023

Related U.S. Application Data

(60) Provisional application No. 63/331,010, filed on Apr. 14, 2022.

(51) Int. Cl.
*H04L 51/214* (2022.01)
*H04L 51/212* (2022.01)
(Continued)

(52) U.S. Cl.
CPC .......... *H04L 51/214* (2022.05); *H04L 51/212* (2022.05); *H04L 67/55* (2022.05); *H04L 67/562* (2022.05); *H04L 67/12* (2013.01)

(58) Field of Classification Search
CPC ..... H04L 51/214; H04L 51/212; H04L 67/55; H04L 67/56; H04L 67/562; H04L 67/12
See application file for complete search history.

(56) References Cited

U.S. PATENT DOCUMENTS 11,811,884 B1    11/2023  Gochenaur
2003/0135556 A1*  7/2003  Holdsworth .............. H04L 9/40
                                                          709/206
(Continued)

FOREIGN PATENT DOCUMENTS

EP    1043671 A2    10/2000

OTHER PUBLICATIONS

"Non Final Office Action Issued in U.S. Appl. No. 17/828,718", dated Mar. 3, 2023, 12 Pages.
(Continued)

*Primary Examiner* — Johnny B Aguiar
(74) *Attorney, Agent, or Firm* — Workman Nydegger

(57) ABSTRACT

Methods, systems, apparatuses, and computer-readable storage mediums are described for bridging brokers of messages from Internet of Things (IoT) devices. In an example system, a first message broker receives a message and an associated topic from an IoT device. A bridging coordinator accesses a topic-to-broker map that indicates, for a second broker, a list of topic filters for which the second message broker has at least one subscriber. The bridging coordinator determines whether the list of topics includes the associated topic. In response to a determination that the list of topic filters in the topic-to-broker map includes the associated topic, the bridging coordinator forward the message to the second message broker. In response to a determination that the list of topic filters does not include the associated topic, the bridging coordinator prevents forwarding of the message to the second message broker.

11 Claims, 5 Drawing Sheets

(51) Int. Cl.
*H04L 67/12* (2022.01)
*H04L 67/55* (2022.01)
*H04L 67/562* (2022.01)

(56) References Cited

U.S. PATENT DOCUMENTS

| | | |
|---|---|---|
| 2006/0056628 A1 | 3/2006 | Todd |
| 2009/0138572 A1* | 5/2009 | Banks .................. H04L 67/306 |
| | | 709/218 |
| 2009/0177753 A1 | 7/2009 | Banks et al. |
| 2009/0182574 A1* | 7/2009 | Beardall ................ G06Q 10/06 |
| | | 705/1.1 |
| 2016/0094649 A1 | 3/2016 | Dornquast et al. |
| 2016/0112438 A1 | 4/2016 | Hengstler et al. |
| 2017/0093857 A1 | 3/2017 | Hinohara |
| 2017/0126603 A1 | 5/2017 | Chen et al. |
| 2018/0167476 A1* | 6/2018 | Hoffner .................. H04L 67/55 |
| 2018/0316641 A1* | 11/2018 | Mankovskii ............ H04L 67/12 |
| 2019/0109805 A1* | 4/2019 | Gallant ................ G06Q 10/107 |
| 2019/0132276 A1* | 5/2019 | Scheiber ................ H04L 67/55 |
| 2019/0268429 A1 | 8/2019 | Dresselhaus et al. |
| 2019/0273790 A1 | 9/2019 | Zhao |
| 2019/0289091 A1 | 9/2019 | Burns et al. |
| 2020/0067903 A1 | 2/2020 | Yegorin |
| 2022/0014594 A1* | 1/2022 | Mladin .................. H04L 67/12 |
| 2022/0109676 A1 | 4/2022 | Balmakhtar et al. |
| 2022/0191018 A1 | 6/2022 | Giblin |
| 2023/0142108 A1 | 5/2023 | Iyer |
| 2023/0336509 A1 | 10/2023 | Miller et al. |
| 2023/0336510 A1 | 10/2023 | Miller |
| 2023/0336547 A1 | 10/2023 | Damour et al. |

OTHER PUBLICATIONS

"International Search Report and Written Opinion Issued In PCT Application No. PCT/US23/011799", dated May 24, 2023, 13 Pages.

"International Search Report and Written Opinion Issued in PCT Application No. PCT/US23/011803", dated Jun. 9, 2023, 13 Pages.

"Non Final Office Action Issued in U.S. Appl. No. 17/828,723", dated Mar. 30, 2023, 16 Pages.

Coulouris, et al., "Distributed Systems: Concepts and Design (5th Edition)", In Publication of Addison Wesley, Fifth Addition, May 7, 2011, 632 Pages.

"International Search Report and Written Opinion Issued In PCT Application No. PCT/US23/011798", dated May 10, 2023, 15 Pages.

"International Search Report and Written Opinion Issued in PCT Application No. PCT/US23/011805", dated Apr. 20, 2023, 13 Pages.

Thean, et al., "Container-based MQTT Broker Cluster for Edge Computing", In Proceedings of 4th International Conference and Workshops on Recent Advances and Innovations in Engineering, Nov. 27, 2019, 6 Pages.

Final Office Action mailed on Nov. 20, 2023, in U.S. Appl. No. 17/828,723, 21 pages.

U.S. Appl. No. 63/330,982, filed Apr. 14, 2022.
U.S. Appl. No. 63/331,010, filed Apr. 14, 2022.
U.S. Appl. No. 63/330,992, filed Apr. 14, 2022.
U.S. Appl. No. 63/331,000, filed Apr. 14, 2022.
U.S. Appl. No. 17/828,713, filed May 31, 2022.
U.S. Appl. No. 17/828,718, filed May 31, 2022.
U.S. Appl. No. 17/828,723, filed May 31, 2022.

Non-Final Office Action mailed on Mar. 19, 2024, in U.S. Appl. No. 17/828,723, 21 pages.

Non-Final Office Action mailed on Mar. 20, 2024, in U.S. Appl. No. 17/828,713, 13 pages.

Final Office Action mailed on Jun. 11, 2024, in U.S. Appl. No. 17/828,723, 22 pages.

Final Office Action mailed on Jul. 15, 2024, in U.S. Appl. No. 17/828,713, 14 pages.

* cited by examiner

500

600

US 12,088,547 B2

EFFICIENT FORWARDING OF MESSAGES THROUGH BROKERS BY TOPIC

CROSS-REFERENCE TO RELATED APPLICATIONS

This application claims priority to provisional U.S. Patent Application No. 63/331,010, filed Apr. 14, 2022, entitled "Efficiently Adding Capabilities Across Multiple Bridged Message Brokers," the entirety of which is incorporated by reference herein.

BACKGROUND

In certain types of messaging environments, client devices can be a publisher or a subscriber, or both, of messages of a given topic or multiple topics. In such environments, a client device sending a message (e.g., a publisher) publishes a message to a topic. The message is received by a message broker responsible for determining which subscribers should receive the message and routing the message to those subscribers. In this manner, once a publisher publishes a message to the topic, subscribers of a topic filter that includes that topic receive the message through the broker.

In these messaging environments, client devices communicate with a single message broker. When the number of client devices or messages increases beyond the capabilities of a single message broker, multiple message brokers may be implemented to handle the additional load. Some or all messages may be mirrored between brokers in order to enable a subscriber in one broker to receive messages published by a publisher in a different broker.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for bridging brokers of messages from Internet of Things (IoT) devices. In an example system, a first message broker receives a message and an associated topic from an IoT device. A bridging coordinator accesses a topic-to-broker map that indicates, for a second broker, a list of topic filters for which the second message broker has at least one subscriber. The bridging coordinator determines whether the list of topics includes the associated topic. In response to a determination that the list of topic filters in the topic-to-broker map includes the associated topic, the bridging coordinator forward the message to the second message broker. In response to a determination that the list of topic filters does not include the associated topic, the bridging coordinator prevents forwarding of the message to the second message broker.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
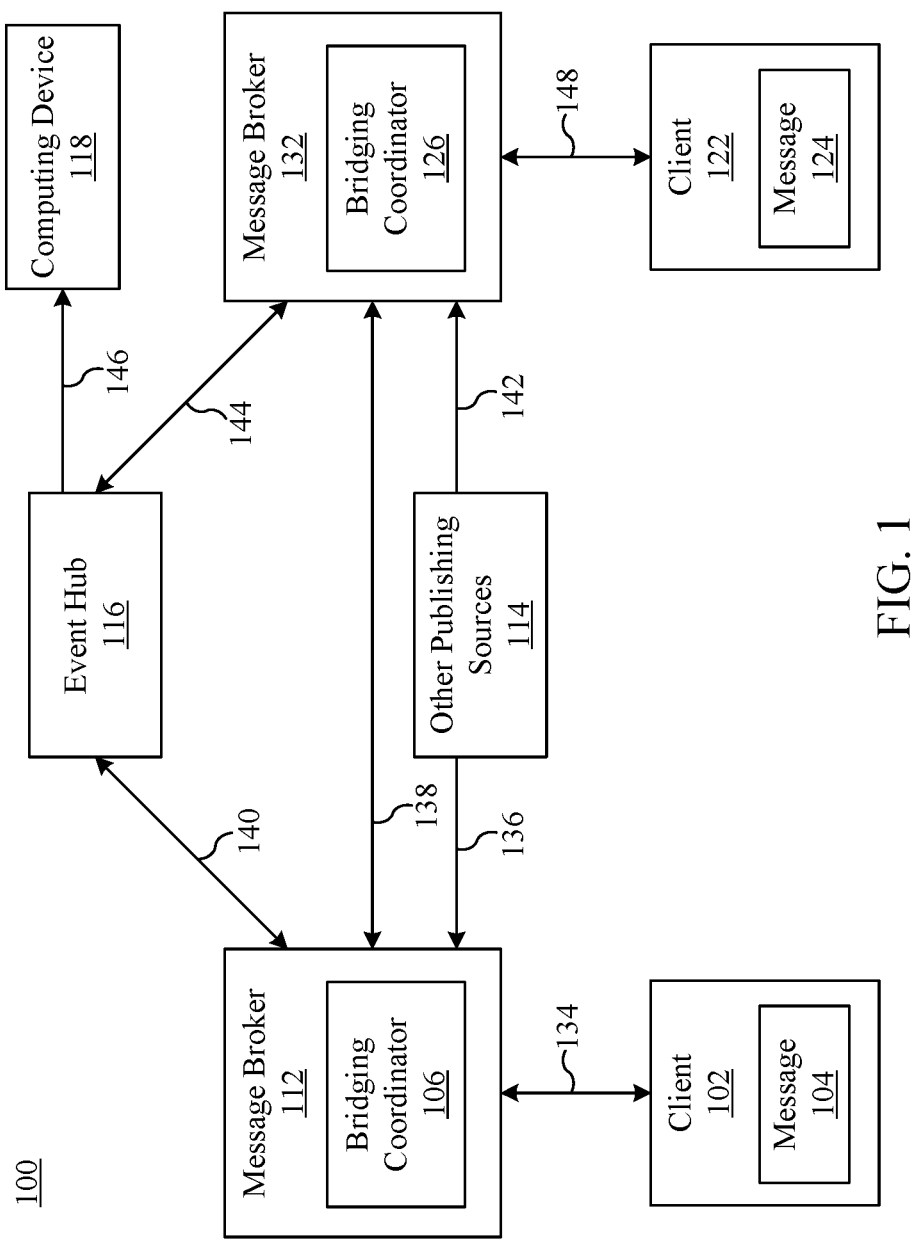
FIG. 1 shows a block diagram of a system for bridging message brokers, in accordance with an example embodiment.

The features and advantages of the embodiments described herein will become more apparent from the detailed description set forth below when taken in conjunction with the drawings. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

In certain types of messaging environments, client devices can be a publisher or a subscriber, or both, of messages of a given topic or multiple topics. In such environments, a client device sending a message (e.g., a publisher) publishes a message to a topic. The message is received by a message broker responsible for determining which subscribers should receive the message and routing the message to those subscribers. In this manner, once a publisher publishes a message to the topic, subscribers of a topic filter that includes that topic receive the message through the broker.

In these messaging environments, client devices communicate with a single message broker. When the number of client devices or messages increases beyond the capabilities of a single message broker, multiple message brokers may be implemented to handle the additional load. However, typical mechanisms involve mirroring all messages between brokers in order to enable a subscriber in one broker to receive messages published by a publisher in a different broker. Such approaches unnecessarily mirror a large number of messages, resulting in an inefficient utilization of resources. In other techniques, certain sections of topics are mirrored between all of the message brokers (e.g., based on pattern matching), but these techniques similarly result in mirroring an excessive amount of messages.

Embodiments described herein address these issues in numerous ways. In an example system, a first message broker receives a message and an associated topic from an IoT device. A bridging coordinator accesses a topic-to-broker map that indicates, for a second broker, a list of topic filters for which the second message broker has at least one subscriber. The bridging coordinator determines whether the list of topics includes the associated topic. In response to a determination that the list of topic filters in the topic-to-broker map includes the associated topic, the bridging coordinator forward the message to the second message broker. In response to a determination that the list of topic filters does not include the associated topic, the bridging coordinator prevents forwarding of the message to the second message broker. In some implementations, a determination may also be made whether the message is bridgeable prior to access the topic-to-broker map (e.g., to determine whether the second message broker should receive the message). The determination regarding whether the message is bridgeable may be made, for instance, based on a topic space associated with the received message.

Bridging message brokers as described herein has numerous advantages, including but not limited to improving the utilization of resources (e.g., computing, memory, and/or network resources) of computing devices. For instance, in accordance with disclosed techniques, a determination may be made for which messages should be forwarded to each message broker in a bridged set of brokers. As a result, a bridged message broker may be forwarded only those messages that it needs (e.g., based on the subscribers for that message broker), and may be configured to forward only those messages that other bridged messages brokers need (e.g., based on the subscribers of topic filters of the other bridged message brokers). By limiting the forwarding of messages in accordance with the disclosed techniques, a reduction in processing resources (e.g., by reducing the number of messages each message broker needs to handle for processing since a broker need not receive messages from other brokers for which it lacks subscribers), memory resources (e.g., by storing, for each broker, only those messages needed by that broker), and networking resources (e.g., by reducing the transmission of unnecessary messages between message brokers over a network) may be attained. Thus, in contrast with other techniques in which all messages for a given topic (or even all topics) are communicated between all of the message brokers in a bridged set of message brokers, disclosed techniques enable the transmission of messages that are actually needed by other brokers based on subscribers coupled to the broker, resulting in various improvements with respect to computing resources.

As such, example embodiments are described herein directed to techniques for bridging message brokers. For instance, FIG. 1 shows a block diagram of an example system for bridging message brokers, in accordance with an example embodiment. As shown in FIG. 1, system 100 includes a client 102, a message broker 112, other publishing sources 114, an event hub 116, a computing device 118, a client 122, and a message broker 132. Client 102 includes a message 104. Message broker 112 includes a bridging coordinator 106. Message broker 132 includes a bridging coordinator 126. Client 122 includes a message 124. Client 102, message broker 112, other publishing sources 114, event hub 116, computing device 118, client 122, and message broker 132 may be communicatively coupled by one or more networks or peer-to-peer connections (not shown). An example computing device that may incorporate the functionality of one or more of client 102, message broker 112, other publishing sources 114, event hub 116, computing device 118, client 122, and message broker 132 (or any subcomponents therein, whether or not illustrated in FIG. 1) is described below in reference to FIG. 7. System 100 may comprise any number of devices, including those illustrated in FIG. 1 and optionally one or more further devices or components not expressly illustrated. System 100 is further described as follows.

A network that couples any of the components shown in FIG. 1 may include one or more of a local area network (LAN), a wide area network (WAN), a personal area network (PAN), a combination of communication networks, such as the Internet, and/or a virtual network. In example implementations, client 102, message broker 112, other publishing sources 114, event hub 116, computing device 118, client 122, and message broker 132 communicate via the network. In an implementation, any one or more of client 102, message broker 112, other publishing sources 114, event hub 116, computing device 118, client 122, and message broker 132 may communicate over the network via one or more application programming interfaces (API) and/or according to other interfaces and/or techniques. Client 102, message broker 112, other publishing sources 114, event hub 116, computing device 118, client 122, and message broker 132 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. In some other examples, any one or more of client 102, message broker 112, other publishing sources 114, event hub 116, computing device 118, client 122, and/or message broker 132 may be coupled by one or more peer-to-peer connections that enables wired and/or wireless communications with each other. Further examples of network interfaces are described elsewhere herein.

Client 102 may include one or more computing devices of one or more users (e.g., individual users, family users, enterprise users, governmental users, etc.) that each comprise one or more applications, operating systems, virtual machines, storage devices, etc. that may transmit and/or receive message 104. Client 102 may be any type of stationary or mobile device, such as an Internet of Things (IoT) device. As used herein, an IoT device comprises any computing device that may connect to another computing device or system via a connection to a network (e.g., the Internet) or a peer-to-peer connection to send and receive data. In some implementations, an IoT device includes one or more physical networking components for wirelessly connecting to the Internet for sending and receiving data (e.g., messages). Examples of client 102 include a vehicle (e.g., an electric vehicle) comprising computing functionality, a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), a camera, a home assistant device, a smart home device, an appliance, or other type of stationary or mobile device. Client 102 is not limited to a physical machine, but may include other types of machines or nodes, such as a virtual machine. In some implementations, client 102 may comprise one or more sensors for capturing information in or around client 102, including but not limited to a temperature sensor, a pressure sensor, an accelerometer, a gyroscope, an orientation sensor, an image sensor, a biometric sensor, or a global positioning system (GPS) sensor. Client 102 may interface with other components illustrated in FIG. 1 through APIs and/or by other mechanisms.

Message 104 includes any set of information that is generated at client 102 for transmission 134 to another entity (e.g., message broker 112) or information that is generated outside of client 102 (e.g., received 136 from other publishing sources 114 or client 122 via message broker 132, or similarly, received 142 by message broker 132 from other publishing sources 114) for transmission 134 to client 102. In some implementations, message 104 may include a publish or a subscribe message in a publish-subscribe messaging environment. For instance, message 104 generated at client 102 (e.g., a publish message) may include information relating to conditions local to client 102 (e.g., a condition, such as a weather condition, based on sensor data at client 102). In other examples, message 104 generated outside of client 102 may include any information relating to a topic filter to which client 102 has subscribed, such as alerts relating to an environment in which client 102 is present (e.g., weather alerts). Message 104 may be associated with a message topic (e.g., a topic may be embedded within or along with message 104). The topic may correspond to a grouping of similar types of message (e.g., similar in content, publishing source, location data, associated user, etc.). In examples, messages received by client 102 may be generated by any device, including but not limited to other clients, other publishing sources 114 (which may include any external device or service that generates a messages), client 122, or any other device or service not expressly illustrated in FIG. 1. These examples are only illustrative, and message 104 may include any type of information generated by client 102 and/or by other publishing sources.

Client 122 and message 124 is similar to client 102 and message 104, respectively. As shown in FIG. 1, client 102 is communicatively coupled to a first message broker (message broker 112), while client 122 is communicatively coupled to a second message broker (message broker 132). For instance, where client 102 seeks to publish message 104, client 102 will send message 104 to message broker 112 to which it is coupled, and message broker 112 (as described in further detail below) will manage the routing (e.g., distribution) of the message. Similarly, where client 122 seeks to publish message 124, client 122 will send 148 message 124 to message broker 132 to which it is coupled, and message broker 132 will manage the routing (e.g., distribution) of the message. A similar distribution of messages may also occur in subscribe scenarios. For instance, where message 104 has an associated topic that matches a topic filter to which client 102 has subscribed, message broker 112 will transmit the message to client 102. Similarly, where message 124 has an associated topic that matches a topic filter to which client 122 has subscribed, message broker 132 will transmit 148 the message to client 122.

In some implementations, any of the message brokers described herein may be implemented in an edge device (e.g., a vehicle) configured to broker messages to and from components within the edge device (e.g., messaging devices within the vehicle itself that are coupled to the message broker of the vehicle). In other words, such an edge device may comprise a message broker that is configured to broker messages between messaging devices coupled to this message broker (e.g., intra-module communications) and to broker messages to and from other messages brokers (e.g., brokers on the cloud). In such instances, due to the limited resources of such a message broker implemented in an edge device, efficient bridging of messages from other message brokers may be desired (e.g., by only transmitting messages to the message broker in the edge device that the edge device actually needs based on its subscribers).

In implementations, message broker 112 may not directly send a message to client 122, and message broker 132 may not directly send a message to client 102 due to client 102 not being coupled to message broker 132, and client 122 not being coupled to message broker 112. For similar reasons, client 102 may not directly transmit a message to message broker 132 for publishing, and client 122 may not directly send a message to message broker 112 for publishing. As will described in greater detail blow, bridging coordinator 106 and/or bridging coordinator 126 may manage the distribution of messages across message brokers.

Message broker 112 may be configured to receive at least message 104 and/or a topic associated with message 104 (e.g., from client 102 or any other publishing source coupled to message broker 112). In examples, message broker 112 determines whether message 104 is allowed to be published to the topic associated with the message. If message broker 112 determines that message 104 is allowed to be published, message broker 112 processes the message. If message broker determines that message 104 is not allowed to be published, message broker rejects the message for publishing to the designated topic.

While the above example is described with respect to publishing a message received from client 102, similar techniques may be employed for messages to which client 102 has subscribed. For instance, when a message arrives at message broker 112 for a given topic, message broker 112 may determine whether client 102 has subscribed to receiving messages for a topic filter (that may include one or more wildcards) that matches the topic associated with message 104. If client 102 has subscribed to messages for a topic filter that matches the associated topic, message broker 112 may cause the message to be transmitted to client 102.

Message broker 132 is similar to message broker 112. For instance, message broker 132 may receive a message and/or an associated topic from client 122 or another publishing source, and determine whether the message may be published or transmitted to a subscriber in a similar manner. In some implementations, message broker 112 and message broker 132 form a bridged set of message brokers, where the bridged set of message brokers may operate in conjunction to distribute messages across various components of system 100. Message broker 112 and message broker 132 may be operated by a single entity, comprise the same functionalities or designs, and/or implement the same protocol (or version thereof). In some other implementations, message broker 112 and message broker 132 may be operated by different entities, may comprise different functionalities or designs, and/or implement different protocols (or versions thereof). While two bridged message brokers (message broker 112 and message broker 132) are described for illustrative purposes, any number of messages brokers may be bridged together to form a bridged set of message brokers in accordance with the disclosed techniques. For instance, each message broker in the bridged set may similarly comprise a bridging coordinator and may comprise any number of client devices that may provide messages to, or receive messages from, the broker to which they are coupled. Further details and examples regarding the operation of message broker 112 and message broker 132 will be discussed below.

Bridging coordinator 106 and bridging coordinator 126 may be configured to coordinate the bridging of messages between message broker 112 and message broker 132. The bridging coordinators may be responsible for, among other things, determining whether a received message belongs to a topic space that may be bridgeable (e.g., whether the message should be considered for bridging to other brokers), and/or identifying which message brokers a given message should be bridged to be based on one or more topic-to-broker maps. Further details regarding the operation of bridging coordinator 106 and/or bridging coordinator 126 will be described below. It is noted that bridging coordinator 106 and/or bridging coordinator 126 need not be implemented within message broker 112 and message broker 132, respectively. Rather, in some other implementations, bridging coordinator 106 and/or bridging coordinator 126 may be implemented as part of other devices or services (e.g., a wrapper in communication with each respective broker).

In an example illustrating the bridging of message brokers, message broker 112 may receive message 104 and a topic associated with message 104 from client 102 (e.g., an IoT device). Bridging coordinator 106 may determine whether message 104 is bridgeable (e.g., should be considered for bridging to other brokers) based on a topic space to which message 104 belongs. If bridging coordinator 106 determines that message 104 is bridgeable, bridging coordinator 106 may access a topic-to-broker map that indicates, for message broker 132 (and/or any additional topic-to-broker maps for additional message brokers not expressly illustrated), a list of topic filters for which message broker 132 has at least one subscriber (which may be client 122, or any other device coupled to message broker 132). Bridging coordinator 106 determines whether the list of topics in the topic-to-broker map for message broker 132 includes the topic associated with message 104. If the list of topics includes the topic associated with message 104 (i.e., message broker 132 has at least one subscriber of a topic filter that includes the associated topic), bridging coordinator 106 may forward message 104 to bridging coordinator 126. Upon receiving message 104, bridging coordinator 126 and/or message broker 132 may process the message for appropriate distribution (e.g., by transmitting message 104 to the appropriate subscribers).

If the list of topics does not include the topic associated with message 104 (i.e., message broker 132 does not have any subscribers of a topic filter that includes the associated topic), bridging coordinator 106 may prevent the forwarding of message 104 to message broker 132. In this manner, only those messages that should be bridged are indeed bridged, thereby preserving computing resources (e.g., processing, storage, and/or network resources).

In some implementations, message broker 112 and/or message broker 132 may publish 140, 144 one or more messages to event hub 116. It is noted that publishing the message(s) to event hub 116 may comprise any suitable technique for providing or otherwise transmitting the message(s) to event hub 116 and is not limited to publishing a message as that term is used herein. Event hub 116 may comprise a data ingestion service configured to receive messages (and/or any other information) and transmit 146 one or more of such messages to other devices, including client 102, client 122, and/or computing device 118. Computing device 118 may be any type of stationary or mobile device, similar to client 102 or client 122 as described above. For instance, computing device 118 may be configured to receive a message generated local to a client device (e.g., an alert generated at client 102 or client 122). While a single event hub is illustrated in FIG. 1, implementations may comprise any number of event hubs. For instance, each message broker shown in FIG. 1 may utilize a different instance of an event hub for publishing messages.

Implementations are not limited to the illustrative arrangement shown in FIG. 1. For instance, client 102, message broker 112, other publishing sources 114, event hub 116, computing device 118, client 122, and message broker 132 may not be separate or remotely located from each other. In some examples, any one or more of client 102, message broker 112, other publishing sources 114, event hub 116, computing device 118, client 122, and message broker 132 (or any subcomponents therein) may be part of or accessible via the same computing device or distributed across a plurality of devices. For instance, a client device (e.g., client 102 or client 122) may comprise a message broker (e.g., message broker 112 or message broker 132) configured to broker messages to different modules, processes, or services local to the client, as well as messages to and from the cloud (e.g., by bridging to another broker, as described herein). Furthermore, it is understood that each of the components illustrated in FIG. 1 need not be present in all implementations. Message broker 112 and/or message broker 132 may also publish messages directly to one or more other devices without event hub 116. System 100 may also comprise any number of additional devices not shown in FIG. 1 that may be coupled in any manner in accordance with the disclosed techniques.

The following descriptions are intended to further describe the above example embodiments and describe additional example embodiments in which implementations may be provided. Furthermore, the descriptions that follow explain additional context for such example embodiments and details relating to the implementations. The descriptions that follow are intended to illustrate various aspects and/or benefits that may be achieved based on techniques described herein, and are not intended to be limiting. Accordingly, while additional example embodiments are described, the features described below are not required in all implementations.

In example embodiments, techniques may be implemented by or in one or more of client 102, message broker 112, other publishing sources 114, event hub 116, computing device 118, client 122, and message broker 132 (or any of their subcomponents). While certain examples are described below with respect to bridging coordinator 106 and/or message broker 112, such illustrations are provided for brevity, and similar techniques may be carried out by bridging coordinator 126 and/or message broker 132 (and vice versa). Other structural and operational implementations will be apparent to persons skilled in the relevant art(s) based on the following discussion.

Disclosed techniques relate to approaches for allowing highly efficient sharing of messages across multiple instances of publish/subscribe-based brokers (e.g., message broker 112 and/or message broker 132). An example of such a message broker includes, but is not limited to, a Message Queueing Telemetry Transport (MQTT) broker. Disclosed techniques allow for horizontal scalability of adding new brokers, including spread across disparate regions with large numbers of messages being sent (e.g., in the millions or even greater). In one aspect of the disclosed techniques, brokers who may require a given message are able to be efficiently identified, in a manner that is efficient in terms of compute and memory resources.

The disclosed techniques provide various improvements to typical mechanisms leveraged by MQTT brokers called "bridging," which do not adequately provide either the dynamicism or scalability needed to handle ultra-scale message loads. In implementations, bridging of brokers occurs where a broker (e.g., message broker 112) can interface 138 with one or more other brokers (e.g., message broker 132). In bridging, a subset of messages is mirrored from one broker to another broker, which enables subscribers coupled to one broker (e.g., client 122 coupled to message broker 132) to receive messages published by a publisher coupled to a different broker (e.g., client 102 coupled to message broker 112). Disclosed techniques relating to bridging messages may be implemented by message broker 112, bridging coordinator 106 and/or bridging coordinator 126, and/or message broker 132.

Each broker (e.g., message broker 112 and/or message broker 132) in a set of bridged brokers may comprise a single logical broker. Such a broker may comprise a service on the cloud and/or may be distributed across many different physical computing devices or virtual machines. While each individual broker may comprise a single endpoint, brokers bridged together may comprise a plurality of endpoints, each endpoint associated with a different broker in the set of bridged brokers. Brokers may be bridged together to form a set of bridged brokers for various reasons, including but not limited to scalability, geography, partitioning, etc. As described herein, however, a given client (e.g., client 102) may be coupled to a single broker (e.g., message broker 112). As a result, that client may only publish or receive messages processed by that broker. In order for the broker to publish to locations of another broker or receive messages from another broker, messages are transferred across brokers in accordance with disclosed techniques. While examples are described herein with respect to MQTT message brokers and MQTT protocols, these examples are illustrative only, and techniques may be implemented in accordance with other interfaces and/or protocols as appreciated by those skilled in the art.

In example embodiments, message brokers (e.g., publish/subscribe, or pub/sub, brokers) operate by decoupling publishers (the sender of a message) and subscribers (the receiver of a message), with publishers publishing to a "topic" and subscribers subscribing to a "topic filter." A single client (e.g., client 102) may be both a publisher and subscriber for many topics and topic filters, respectively. Topics may comprise suitable structure or format. In one example, topic may comprise segments (e.g., strings) separated by '7' characters. Topic filters are similar to topics, but also may contain one or more wildcard characters. Specific wildcard characters used in a given environment may depend on the particular pub/sub protocol used. In one implementation, wildcard characters may be based on an MQTT protocol, in which a '+' character represents a single-level wildcard and a '#' character represents a multi-level wildcard, which will match any number of segments but appears last in the topic filter. Topics, however, may not contain wildcard characters, while topic filters can contain wildcard characters. As a result, a publish action cannot use wildcards, whereas a subscribe action can use wildcards.

In some systems where there are a large number of clients (e.g., in the millions or greater) publishing and subscribing across many topics, a large number of messages are needed to be processed across the brokers. In example embodiments, topics spaces may be used to address this problem space. A topic space is a template that establish patterns for a topic or topic filter. Topic spaces may be declared ahead of time in brokers. In implementations, message brokers may enforce a restriction that topic spaces are declared in a non-overlapping manner. For instance, any topic or topic filter should be uniquely mappable to a single topic space. As an example, a topic space may be "example/{clientId}", where {clientId} is a string literal indicating that this is a placeholder part that will be replaced when executing a publish or subscribe action. A topic space has these {placeholders} to indicate which parts are templatized to form topics or topic filters. This example topic space would match any topic that starts with "example/" and then has a single topic segment after it.

In examples, topic spaces may also include one or more wildcards with or without placeholders described herein. As an illustration, a topic space "example/{clientId}/+" could include a client subscription of "example/myClientId/sensor" where "myClientID" represents the placeholder which would be used in a lookup of the topic-to-broker map to determine which message brokers a given message should be forwarded to, and "sensor" is recognized as being a part of the "+" set. In this manner, "example/myClientId/sensor" would map to the "example/{clientId}/+" topic space. This example is only illustrative, and any other combination of wildcards and/or placeholders may be present in implementations.

In examples, topic spaces may allow for a reduction in the potential problem space of cross-broker bridging because topic spaces can be declared ahead of time as being cross-broker bridgeable or not. In examples, if a topic space is declared as non-cross-broker bridgeable, then a publish associated with the topic space would not be bridged to other brokers. A first step in evaluating any publish message (e.g., message 104) received by a message broker (e.g., message broker 112) is to determine (e.g., by bridging coordinator 106) which topic space the message belongs to. Bridging coordinator 106 may determine which topic space to which message 104 based on the topic associated with message 104. If the message belongs to a topic space that is not cross-broker bridgeable, bridging coordinator 106 determines that the message should not be bridged to other brokers (e.g., the message broker prevents the message from being forwarded to other message brokers), thereby preserving computing resources (e.g., processing, memory, and network resources). In other words, a threshold check may be performed by bridging coordinator 106 to identify whether messages are candidates for cross-broker bridging. In this manner, topic spaces may allow for a reduction in the number of topics that must be further evaluated to determine whether a message should actually be bridged to other brokers. This aspect, however, is not needed in all implementations, and techniques described herein may operate without such a step being performed.

In some implementations (with or without a limited scope of problem space as described), a publish on a given broker (e.g., message broker 112) can be routed to a subscriber in another broker (e.g., message broker 132) efficiently in accordance with disclosed techniques. In one implementation, after evaluation of the topic space membership for a topic being published to (if performed), bridging coordinator 106 may discover a list of relevant destination broker instances for a particular message (e.g., message 104) using a topic-to-broker map that may contain one or more placeholders for topics in the map. Each message broker may contain a topic-to-broker map for each other broker in the set of bridged message brokers. To perform this lookup, segments of the placeholders may be used, which allows the search space to be constrained in a manner allowing for manageable time and space complexity. For instance, in case of the aforementioned example, once the topic space has been identified, only the {clientId} segment would be used by bridging coordinator 106 during the lookup. Implementations, however, do not require the use of topic spaces or placeholders, as noted above. Rather, a topic-to-broker map may comprise a listing of each topic for which a broker has subscribers, and a lookup may be performed by bridging coordinator 106 based on the listing of topics. Where wildcards are present, the lookup may be performed by applying wildcard semantics during the lookup. Once a list of relevant brokers (e.g., the brokers which have at least one subscriber to a topic filter that includes the topic associated with message 104) is retrieved, the message (or messages) is forwarded by bridging coordinator 106 to only the brokers in the retrieved list (i.e., only those brokers that are identified as having at least one subscriber to a topic filter that includes the associated topic) as opposed to every broker in the full set of brokers used in the "bridging" mechanism. The receiving broker(s) may then transmit the message to any of their subscribers based on their subscriptions.

In order to perform efficient lookup and routing of topics to their relevant brokers, each message (e.g., message broker 112 and message broker 132) may maintain one or more topic-to-broker maps. In examples, each topic-to-broker map is also maintained in a manner in which it is kept up to date. To generate the topic-to-broker map and maintain it in an up-to-date manner, a snapshot and/or change feed are used by each message broker. Each broker shall create a snapshot of the list of topic filters it has subscribers for. Updated snapshots indicating an updated list of topics for which each broker has at least one subscriber may be created at a regular cadence (e.g., each minute, hour, day, etc.), or based on any interval or trigger (e.g., a manual trigger). This snapshot can be received and consumed by other brokers to update their respective topic-to-broker maps.

In addition to the snapshot, each broker may also make available a change feed to other brokers to inform the other brokers of any additional topic filters it has subscribers for, and each receiving broker may update their topic-to-broker maps by adding the additional information in the change feed. In other words, the change feed may comprise information relating to any topic filters that have subscribers which were not present in the most recent snapshot created by that broker (e.g., transmitting a delta, rather than a full set). In this manner, the amount of data transmitted over a network may be reduced. Any suitable data structure may be used for these purposes, including but not limited to, Tries, HashMaps and Graphs (or combinations thereof). Such a data structure can be used to construct a time and space efficient topic-to-broker map, allowing for a topic-to-be mapped to a list of brokers.

Each broker may store topic-to-broker maps in any fashion. In one implementation, a broker (e.g., message broker 112) may store its own topic-to-broker map (which may be transmitted to other brokers) and each topic-to-broker map received from (e.g., shared by) other brokers (e.g., message broker 132), along with an identifier of each transmitting broker. In another implementation, each broker may combine all the topic-to-broker maps received from other brokers into a single map. In some other implementations, one or more topic-to-broker maps as described herein may be stored in and/or accessible from one or more locations (e.g., on the cloud) remote to one or more message brokers. These examples are only illustrative, and other techniques for storing topic-to-broker maps using any suitable data structure are contemplated.

In implementations, topic-to-broker maps may also be updated by each bridging coordinator based on unsubscribes (e.g., when a subscriber no longer subscribes to a particular topic filter) or disconnects. For instance, in some examples, snapshots as described above of each broker's topic filters may be published relatively infrequently, and the change feed may contain only information relating to new subscribers. As a result, it is possible for clients to unsubscribe or disconnect and still have an entry for their topic filter in brokers other than the broker the client was directly connected to. For this case, publishes may still be delivered to brokers that do not have relevant subscribers. However, once a new snapshot is performed by the broker to which the client was directly connected, it will be determined that the client no longer subscribes to the particular topic filter and each topic-to-broker map across the brokers will be updated once this snapshot is distributed. In this manner, the disconnected subscribers will be pruned from other brokers when they reload a snapshot.

In yet some other examples, unsubscribes may also be included in the change feed described above, such that brokers (or bridging coordinators as described herein) receiving the change feed may use the unsubscribes to selectively update (e.g., remove) parts of the topic-to-broker maps. Such techniques may enable further optimization of cross-broker traffic (e.g., by reducing the number of messages that are bridged across one or more brokers) in many situations, such as where frequent unsubscribes are present.

Figure 2:
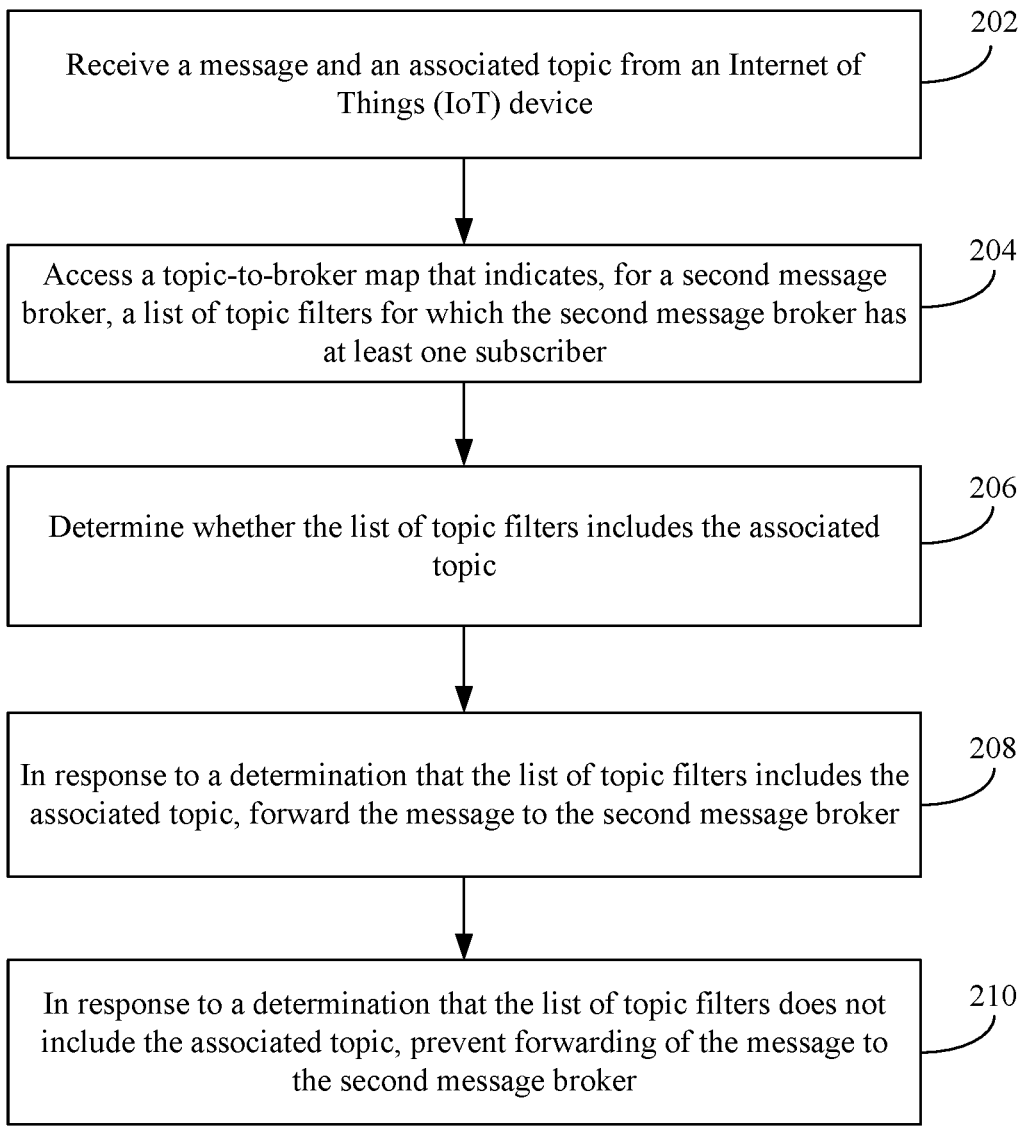
FIG. 2 shows a flowchart of a method for bridging brokers of messages from IoT devices, in accordance with an example embodiment.

The bridging of messages across message brokers in system 100 may be carried out in various ways. For instance, message brokers may be bridged together to distribute messages according to FIG. 2. FIG. 2 shows a flowchart 200 of a method for bridging brokers of messages from IoT devices, in accordance with an example embodiment. In an implementation, the method of flowchart 200 may be implemented by message broker 112, bridging coordinator 106, bridging coordinator 126, and/or message broker 132. FIG. 2 is described with continued reference to FIG. 1. Other structural and operational implementations will be apparent to persons skilled in the relevant art(s) based on the following discussion regarding flowchart 200 and system 100 of FIG. 1. While example embodiments are described with respect to components of system 100 and flowchart 200, these examples are illustrative.

Flowchart 200 begins with step 202. In step 202, a first message broker receives a message and an associated topic from an IoT device. For instance, with reference to FIG. 1, message broker 112 may be configured to receive message 104 from client 102 which may comprise an IoT device. Message 104 may be designated for publishing to any topic, and may include an identification of the associated topic.

In step 204, a topic-to-broker map is accessed that indicates, for a second message broker, a list of topic filters for which the second message broker has at least one subscriber. For instance, with reference to FIG. 1, bridging coordinator 106 may be configured to access a topic-to-broker map stored in and/or accessible by message broker 112 that indicates, for message broker 132, a list of topic filters for which message broker 132 has at least one subscriber (e.g., client 122 in some examples).

As described above, example embodiments are not limited to implementations in which only two bridged message brokers are present. Rather, any number of message brokers may be bridged together. In such implementations involving many bridged brokers, bridging coordinator 106 may access a topic-to-broker map for each of the message brokers in the bridged set of message brokers in a similar manner as described.

In step 206, a determination is made whether the list of topic filters in the topic-to-broker map includes the associated topic. For instance, with reference to FIG. 1, bridging coordinator 106 may be configured to determine whether the list of topic filters in the topic-to-broker map for message broker 132 includes the topic associated with message 104 received by message broker 112. In other words, bridging coordinator 106 may determine, using the topic-to-broker map associated with message broker 132, whether message broker 132 has at least one subscriber of a topic filter that includes the topic associated with message 104, such that message 104 may need to be forwarded to message broker 132.

In step 208, in response to a determination that the list of topic filters includes the associated topic, the message is forwarded to the second message broker. For instance, with reference to FIG. 1, in response to a determination that the list of topic filters in the topic-to-broker map associated with message broker 132 includes the topic associated with message 104, bridging coordinator 106 may forward message 104 to message broker 132 as described herein. Message broker 132, upon receiving message 104, may appropriately distribute message 104 based on subscribers coupled to message broker 132 that have subscribed to receiving messages that match the topic associated with message 104.

In step 210, in response to a determination that the list of topic filters does not include the associated topic, bridging coordinator 106 may be configured to prevent forwarding of the message to the second message broker. For instance, with reference to FIG. 1, in response to a determination that the list of topic filters in the topic-to-broker map associated with message broker 132 does not include the topic associated with message 104, bridging coordinator 106 may prevent forwarding of message 104 to message broker 132. In other words, since message broker 132 does not have any subscribers of a topic filter that would include the topic associated with message 104, bridging coordinator 106 may determine that message broker 132 does not need to receive message 104 for any purpose (e.g., for further distribution). In such instances, bridging coordinator 106 may prevent the forwarding of message 104 to message broker 132, which may result in preserving computing resources as described above.

Figure 3:
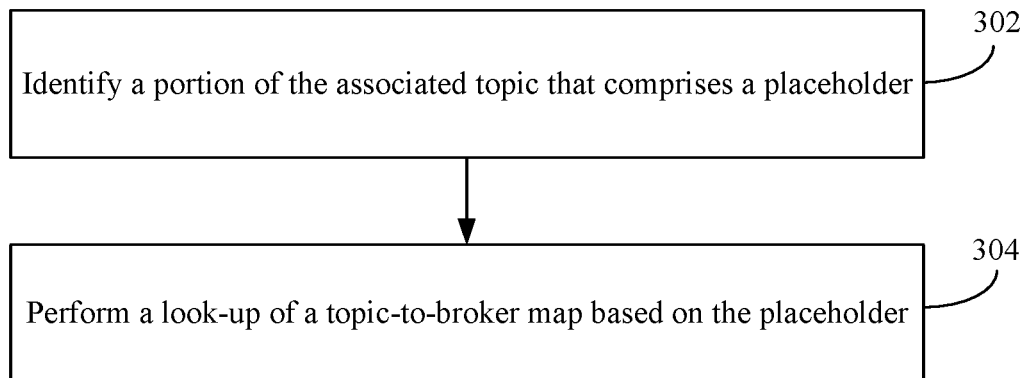
FIG. 3 shows a flowchart of a method for performing a lookup of a topic-to-broker map, in accordance with an example embodiment.

As discussed above, bridging coordinator 106 and/or bridging coordinator 126 may perform a lookup based on a placeholder. For instance, FIG. 3 shows a flowchart 300 of a method for performing a lookup of a topic-to-broker map, in accordance with an example embodiment. In an implementation, the method of flowchart 300 may be implemented by bridging coordinator 106 and/or bridging coordinator 126. FIG. 3 is described with continued reference to FIG. 1. Other structural and operational implementations will be apparent to persons skilled in the relevant art(s) based on the following discussion regarding flowchart 300 and system 100 of FIG. 1.

Flowchart 300 begins with step 302. In step 302, a portion of the associated topic that comprises a placeholder is identified. For instance, with reference to FIG. 1, bridging coordinator 106 may be configured to analyze the topic associated with message 104 to identify which portion or portions of the topic comprises a placeholder, as described above. Identification of a placeholder may be based on, for example, an identification of topic spaces that define a template (e.g., a structure, format, etc.) for topics or topic filters. In examples, a topic spaces may contain one or more placeholders (e.g., characters, strings, etc. that would be replaced in the event of a publish or subscribe action). Based on those topic spaces, bridging coordinator 106 may determine, for the topic associated with message 104, which portions of the associated topic comprises a placeholder.

In step 304, a lookup of the topic-to-broker map is performed based on the placeholder. For instance, with reference to FIG. 1, bridging coordinator 106 may be configured to perform a lookup of the topic-to-broker map (e.g., associated with message broker 132) based on the placeholder (or a set of multiple placeholders, if identified). In this manner, rather than performing an entire topic string in topic-to-broker map to identify whether message 104 should be bridged to message broker 132, bridging coordinator 106 may perform a lookup using only the placeholder segments to reduce the search space, which may preserve processing resources in conducting the search and improve the speed for conducting the lookup.

Figure 4:
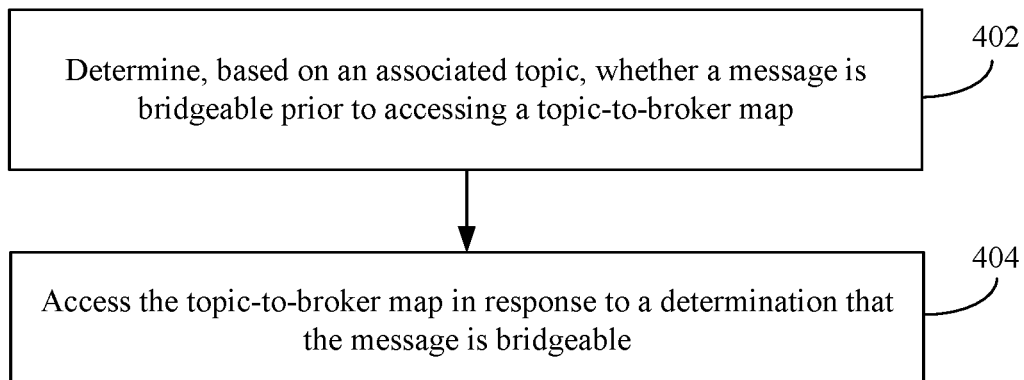
FIG. 4 shows a flowchart of a method for accessing a topic-to-broker map in response to a determination that a message is bridgeable, in accordance with an example embodiment.

As discussed above, bridging coordinator 106 and/or bridging coordinator 126 may be configured to perform a threshold determination whether a message should be considered for bridging to other message brokers. For instance, FIG. 4 shows a flowchart 400 of a method for accessing a topic-to-broker map in response to a determination that a message is bridgeable, in accordance with an example embodiment. In an implementation, the method of flowchart 400 may be implemented by bridging coordinator 106 and/or bridging coordinator 126. FIG. 4 is described with continued reference to FIG. 1. Other structural and operational implementations will be apparent to persons skilled in the relevant art(s) based on the following discussion regarding flowchart 400 and system 100 of FIG. 1.

Flowchart 400 begins with step 402. In step 402, a determination is made, based on a topic associated with a message, whether the message is bridgeable prior to accessing a topic-to-broker map. For instance, with reference to FIG. 1, bridging coordinator 106 may be configured to determine, based on a topic associated with message 104, whether message 104 is bridgeable (e.g., whether it should be considered for bridging to other brokers) prior to accessing a topic-to-broker map. Bridging coordinator 106 may determine whether a message is bridgeable in various ways, as described herein. For example, bridging coordinator 106 may determine whether the associated topic belongs to a topic space that has been identified (e.g., based on predetermined information) as one that should or should not be considered for bridging to other message brokers. If the message belongs to a topic space that is identified as not cross-broker bridgeable as a threshold matter, bridging coordinator 106 may determine that the message should not be forwarded to any other message brokers.

In step 404, the topic-to-broker map is accessed in response to a determination that the message is bridgeable. For instance, with reference to FIG. 1, bridging coordinator 106 may be configured to access the topic-to-broker map associated with one or more other message brokers (e.g., message broker 132) in response to a determination that message 104 is bridgeable (i.e., message 104 should be considered for bridging). In accordance with techniques described herein, determining that a message is bridgeable does not necessarily indicate that a message should be bridged. Rather, such a threshold check serves to filter out messages that should not be bridged under any circumstance. For messages that are identified as cross-broker bridgeable, disclosed techniques may be utilized to determine which message brokers, if any, should receive message 104.

Figure 5:
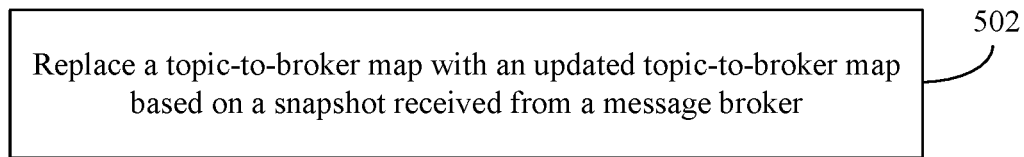
FIG. 5 shows a flowchart of a method for updating a topic-to-broker map, in accordance with an example embodiment.

As discussed above, a topic-to-broker map may be updated in various ways. For instance, FIG. 5 shows a flowchart 500 of a method for updating a topic-to-broker map, in accordance with an example embodiment. In an implementation, the method of flowchart 500 may be implemented by bridging coordinator 106 and/or bridging coordinator 126. FIG. 5 is described with continued reference to FIG. 1. Other structural and operational implementations will be apparent to persons skilled in the relevant art(s) based on the following discussion regarding flowchart 500 and system 100 of FIG. 1.

Flowchart 500 begins with step 502. In step 502, a topic-to-broker map is replaced with an updated topic-to-broker map based on a snapshot received from a message broker. For instance, with reference to FIG. 1, bridging coordinator 106 may receive a snapshot from bridging coordinator 126 of message broker 132, where the snapshot comprises an updated list of topic filters for which message broker 132 has at least one subscriber. Upon receiving the snapshot received from message broker 132, bridging coordinator 106 may replace the topic-to-broker map associated with message broker 132 with an updated topic-to-broker map based on the received snapshot. In implementations, bridging coordinator 106 may replace an entire topic-to-broker map with based on a received snapshot and/or may selectively replace certain portions therein (e.g., by updating portions of the topic-to-broker map that need to be changed).

Figure 6:
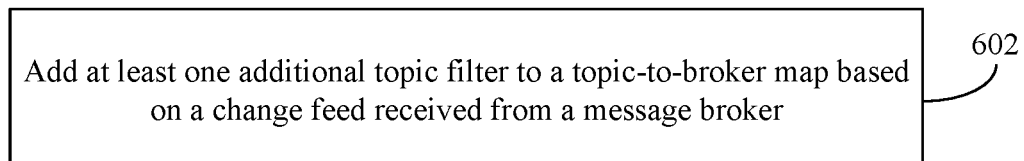
FIG. 6 shows a flowchart of another method for updating a topic-to-broker map, in accordance with an example embodiment.

Other techniques may also be employed to update a topic-to-broker map. For instance, FIG. 6 shows a flowchart 600 of another method for updating a topic-to-broker map, in accordance with an example embodiment. In an implementation, the method of flowchart 600 may be implemented by bridging coordinator 106 and/or bridging coordinator 126. FIG. 6 is described with continued reference to FIG. 1. Other structural and operational implementations will be apparent to persons skilled in the relevant art(s) based on the following discussion regarding flowchart 600 and system 100 of FIG. 1.

Flowchart 600 begins with step 602. In step 602, at least one additional topic filter is added to a topic-to-broker map based on a change feed received from a message broker. For instance, with reference to FIG. 1, bridging coordinator 106 may be configured to receive a change feed from another message broker (e.g., message broker 132), where the change feed indicates one or more additional topic filters for which the other message broker has subscribes (e.g., new topic filters which were not included in a most topic-to-broker map or snapshot for the message broker). Based on the change feed, bridging coordinator 106 may update the topic-to-broker map for the other message broker by adding the new topic filter indicated in the change feed.

III. Example Computer System Implementation

Client 102, bridging coordinator 106, message broker 112, other publishing sources 114, event hub 116, computing device 118, client 122, bridging coordinator 126, message broker 132, flowchart 200, flowchart 300, flowchart 400, flowchart 500, and/or flowchart 600 may be implemented in hardware, or hardware combined with one or both of software and/or firmware. For example, client 102, bridging coordinator 106, message broker 112, other publishing sources 114, event hub 116, computing device 118, client 122, bridging coordinator 126, message broker 132, flowchart 200, flowchart 300, flowchart 400, flowchart 500, and/or flowchart 600 may be implemented as computer program code/instructions configured to be executed in one or more processors and stored in a computer readable storage medium.

Alternatively, client 102, bridging coordinator 106, message broker 112, other publishing sources 114, event hub 116, computing device 118, client 122, bridging coordinator 126, message broker 132, flowchart 200, flowchart 300, flowchart 400, flowchart 500, and/or flowchart 600 may be implemented as hardware logic/electrical circuitry.

For instance, in an embodiment, one or more, in any combination, of client 102, bridging coordinator 106, message broker 112, other publishing sources 114, event hub 116, computing device 118, client 122, bridging coordinator 126, message broker 132, flowchart 200, flowchart 300, flowchart 400, flowchart 500, and/or flowchart 600 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
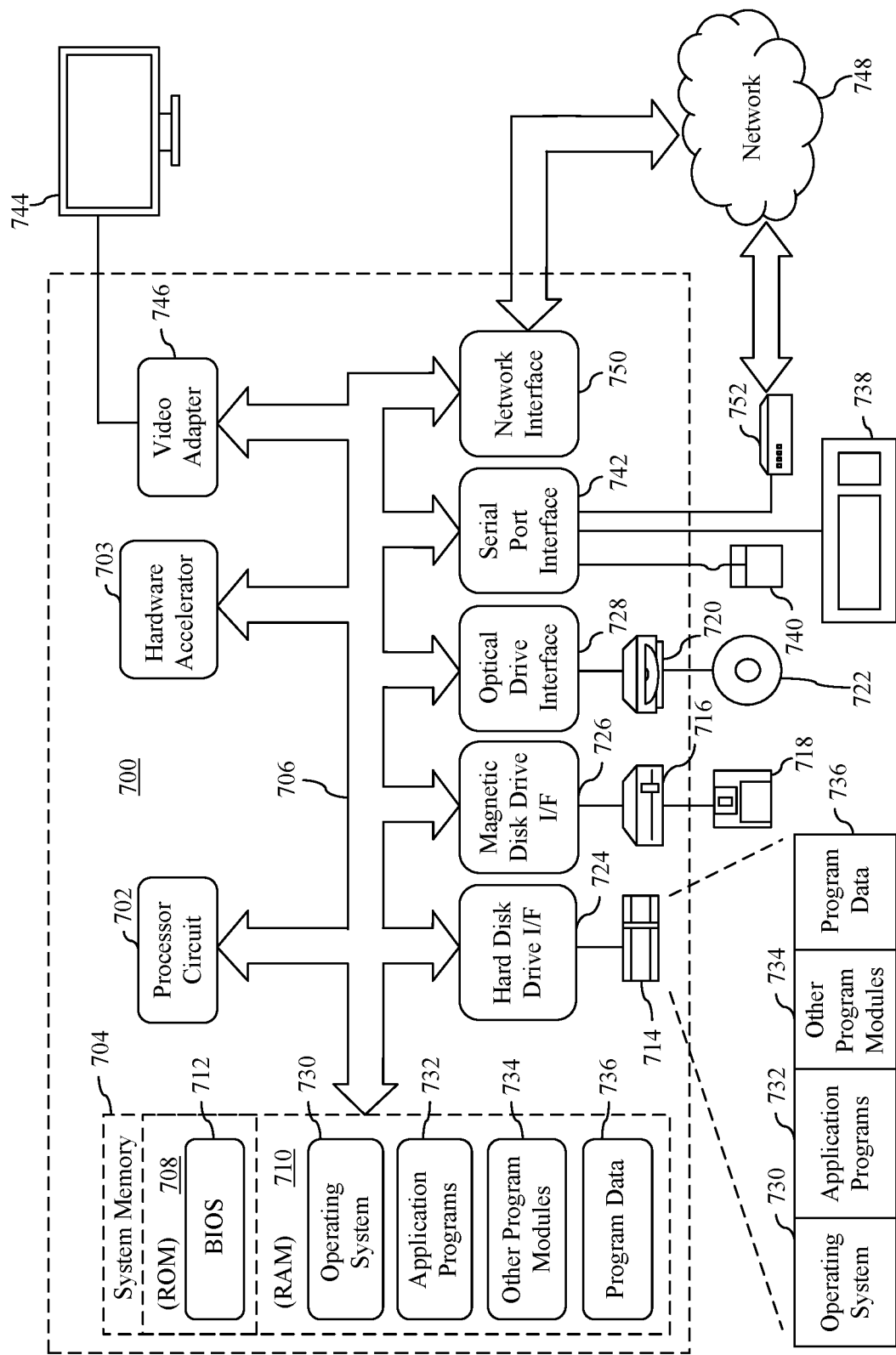
FIG. 7 is a block diagram of an example processor-based computer system that may be used to implement various embodiments.

FIG. 7 depicts an exemplary implementation of a computing device 700 in which embodiments may be implemented. For example, client 102, bridging coordinator 106, message broker 112, other publishing sources 114, event hub 116, computing device 118, client 122, bridging coordinator 126, message broker 132, flowchart 200, flowchart 300, flowchart 400, flowchart 500, and/or flowchart 600 (and/or any of the steps of flowcharts 200, 300, 400, 500, and/or 600) may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a hardware accelerator 703, a system memory 704, and a bus 706 that couples various system components including system memory 704 to processor circuit 702 and hardware accelerator 703. Processor circuit 702 and/or hardware accelerator 703 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM (compact disc read only memory), DVD ROM (digital video disc read only memory), or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing any of the features of client 102, bridging coordinator 106, message broker 112, other publishing sources 114, event hub 116, computing device 118, client 122, bridging coordinator 126, message broker 132, flowchart 200, flowchart 300, flowchart 400, flowchart 500, and/or flowchart 600 and/or further embodiments described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with propagating signals and communication media (do not include propagating signals and communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A system for bridging brokers of messages from IoT devices is disclosed herein. The system includes: at least one processor circuit; and at least one memory that stores program code configured to be executed by the at least one processor circuit, the program code comprising: a first message broker configured to receive a message and an associated topic from an IoT device; and a bridging coordinator configured to: access a topic-to-broker map that indicates, for a second message broker, a list of topic filters for which the second message broker has at least one subscriber, determine whether the list of topic filters includes the associated topic, in response to a determination that the list of topic filters includes the associated topic, forward the message to the second message broker, and in response to a determination that the list of topic filters does not include the associated topic, prevent forwarding of the message to the second message broker.

In one implementation of the foregoing system, the bridging coordinator is configured to determine whether the list of topic filters includes the associated topic by identifying a portion of the associated topic that comprises a placeholder, and performing a lookup of the topic-to-broker map based on the placeholder.

In another implementation of the foregoing system, the bridging coordinator is configured to: determine, based on the associated topic, whether the message is bridgeable prior to accessing the topic-to-broker map, and access the topic-to-broker map in response to a determination that the message is bridgeable.

In another implementation of the foregoing system, the bridging coordinator is configured to replace the topic-to-broker map with an updated topic-to-broker map based on a snapshot received from the second message broker, the snapshot comprising an updated list of topic filters for which the second message broker has at least one subscriber.

In another implementation of the foregoing system, the bridging coordinator is configured to add at least one additional topic filter to the topic-to-broker map based on a change feed received from the second message broker.

In another implementation of the foregoing system, the second message broker is implemented in an edge device and configured to broker messages to and from components within the edge device.

In another implementation of the foregoing system, the IoT device comprises one of: a vehicle; a sensor; a camera; a wearable device; a home assistant; a smart home device; or an appliance.

A method for bridging brokers of messages from IoT devices is disclosed herein. The method includes: receiving a message and an associated topic from an IoT device; accessing a topic-to-broker map that indicates, for a second message broker, a list of topic filters for which the second message broker has at least one subscriber; determining whether the list of topic filters includes the associated topic; in response to determining that the list of topic filters includes the associated topic, forwarding the message to the second message broker; and in response to determining that the list of topic filters does not include the associated topic, preventing forwarding of the message to the second message broker.

In one implementation of the foregoing method, the determining whether the list of topic filters includes the associated topic comprises: identifying a portion of the associated topic that comprises a placeholder; and performing a lookup of the topic-to-broker map based on the placeholder.

In another implementation of the foregoing method, the method further includes determining, based on the associated topic, whether the message is bridgeable prior to accessing the topic-to-broker map, wherein the accessing the topic-to-broker map is performed in response to determining that the message is bridgeable.

In another implementation of the foregoing system, the method further includes replacing the topic-to-broker map with an updated topic-to-broker map based on a snapshot received from the second message broker, the snapshot comprising an updated list of topic filters for which the second message broker has at least one subscriber.

In another implementation of the foregoing system, the method further includes adding at least one additional topic filter to the topic-to-broker map based on a change feed received from the second message broker.

In another implementation of the foregoing system, the second message broker is implemented in an edge device and configured to broker messages to and from components within the edge device.

In another implementation of the foregoing system, the IoT device comprises one of: a vehicle; a sensor; a camera; a wearable device; a home assistant; a smart home device; or an appliance.

A computer-readable storage medium is disclosed herein. The computer-readable storage medium has program instructions recorded thereon that, when executed by at least one processor of a computing device, perform a method, the method comprising: receiving a message and an associated topic from an IoT device; accessing a topic-to-broker map that indicates, for a second message broker, a list of topic filters for which the second message broker has at least one subscriber; determining whether the list of topic filters includes the associated topic; in response to determining that the list of topic filters includes the associated topic, forwarding the message to the second message broker; and in response to determining that the list of topic filters does not include the associated topic, preventing forwarding of the message to the second message broker.

In one implementation of the foregoing computer-readable storage medium, the determining whether the list of topic filters includes the associated topic comprises: identifying a portion of the associated topic that comprises a placeholder; and performing a lookup of the topic-to-broker map based on the placeholder.

In another implementation of the foregoing computer-readable storage medium, the method further comprises determining, based on the associated topic, whether the message is bridgeable prior to accessing the topic-to-broker map, wherein the accessing the topic-to-broker map is performed in response to determining that the message is bridgeable.

In another implementation of the foregoing computer-readable storage medium, the method further comprises replacing the topic-to-broker map with an updated topic-to-broker map based on a snapshot received from the second message broker, the snapshot comprising an updated list of topic filters for which the second message broker has at least one subscriber.

In another implementation of the foregoing computer-readable storage medium, the method further comprises adding at least one additional topic filter to the topic-to-broker map based on a change feed received from the second message broker.

In another implementation of the foregoing computer-readable storage medium, the second message broker is implemented in an edge device and configured to broker messages to and from components within the edge device.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments but should be defined only in accordance with the following claims and their equivalents.

What is claimed is:

1. A system for bridging brokers of messages from Internet of Things (IoT) devices, the system comprising:
    at least one processor circuit; and
    at least one memory that stores program code configured to be executed by the at least one processor circuit, the program code comprising:
        a first message broker configured to receive a message and an associated topic from an IoT device; and
        a bridging coordinator configured to:
            prior to accessing a topic-to-broker map indicating subscriptions to topics by another message broker, determine whether the message is allowed to be published to the associated topic by accessing a topic space that identifies topics that are or are not candidates for cross-broker bridging;
            when the message is not allowed to be published to the associated topic, then reject the message for publishing to the associated topic; and
            when the message is allowed to be published to the associated topic, then:
                access the topic-to-broker map that indicates, for a second message broker, a list of topic filters for which the second message broker has at least one subscriber,
                determine whether the list of topic filters includes the associated topic,
                when the list of topic filters includes the associated topic, forward the message to the second message broker, and
                when the list of topic filters does not include the associated topic, prevent forwarding of the message to the second message broker.

2. The system of claim 1, wherein the bridging coordinator is configured to determine whether the list of topic filters includes the associated topic by:
    identifying a portion of the associated topic that comprises a placeholder, and
    performing a lookup of the topic-to-broker map based on the placeholder.

3. The system of claim 1, wherein the bridging coordinator is configured to:
    replace the topic-to-broker map with an updated topic-to-broker map based on a snapshot received from the second message broker, the snapshot comprising an updated list of topic filters for which the second message broker has at least one subscriber.

4. The system of claim 1, wherein the bridging coordinator is configured to:
    add at least one additional topic filter to the topic-to-broker map based on a change feed received from the second message broker.

5. The system of claim 1, wherein the second message broker is implemented in an edge device and configured to broker messages to and from components within the edge device.

6. The system of claim 1, wherein the IoT device comprises one of:
    a vehicle;
    a sensor;
    a camera;
    a wearable device;
    a home assistant;
    a smart home device; or
    an appliance.

7. A computer-readable storage medium having program instructions recorded thereon that, when executed by at least one processor of a computing device, perform a method, the method comprising:
    receiving a message and an associated topic from an IoT device;
    prior to accessing a topic-to-broker map indicating subscriptions to topics by another message broker, determining whether the message is allowed to be published to the associated topic by accessing a topic space that identifies topics that are or are not candidates for crossbroker bridging;
    when the message is not allowed to be published to the associated topic, then rejecting the message for publishing to the associated topic; and
    when the message is allowed to be published to the associated topic, then:
        accessing the topic-to-broker map that indicates, for a second message broker, a list of topic filters for which the second message broker has at least one subscriber;
        determining whether the list of topic filters includes the associated topic;
        when the list of topic filters includes the associated topic, forwarding the message to the second message broker; and
        when the list of topic filters does not include the associated topic, preventing forwarding of the message to the second message broken.

8. The computer-readable storage medium of claim 7, wherein the determining whether the list of topic filters includes the associated topic comprises:
    identifying a portion of the associated topic that comprises a placeholder; and performing a lookup of the topic-to-broker map based on the placeholder.

9. The computer-readable storage medium of claim 7, wherein the method further comprises:
   replacing the topic-to-broker map with an updated topic-to-broker map based on a snapshot received from the second message broker, the snapshot comprising an updated list of topic filters for which the second message broker has at least one subscriber.

10. The computer-readable storage medium of claim 7, wherein the method further comprises:
    adding at least one additional topic filter to the topic-to-broker map based on a change feed received from the second message broker.

11. The computer-readable storage medium of claim 7, wherein the second message broker is implemented in an edge device and configured to broker messages to and from components within the edge device.

* * * * *